United States Patent [19]
Shin

[11] Patent Number: 6,006,109
[45] Date of Patent: Dec. 21, 1999

[54] WIRELESS DATA COMMUNICATION SYSTEM USING A MICROPHONE/HEADPHONE JACK OF A PORTABLE PHONE

[75] Inventor: Seong-Kee Shin, Kyungki-do, Rep. of Korea

[73] Assignee: SamSung Electronics Co., Ltd., Kyungki-do, Rep. of Korea

[21] Appl. No.: 08/852,493

[22] Filed: May 7, 1997

[30]     Foreign Application Priority Data

May 7, 1996 [KR] Rep. of Korea ...................... 96-14823

[51] Int. Cl.$^6$ ..................................... H04B 1/38
[52] U.S. Cl. ........................................... 455/557; 455/556
[58] Field of Search .................................. 455/550, 556, 455/557, 558, 575, 90; 379/45; 330/254, 129, 295

[56]          References Cited

U.S. PATENT DOCUMENTS

| | | | |
|---|---|---|---|
| 4,467,281 | 8/1984 | Davis et al. | 324/232 |
| 4,718,080 | 1/1988 | Serrano et al. | 379/59 |
| 4,723,278 | 2/1988 | Nishio et al. | 379/394 |
| 4,914,686 | 4/1990 | Hagar, III et al. | 379/61 |
| 4,924,191 | 5/1990 | Erb et al. | 330/130 |
| 4,972,457 | 11/1990 | O'Sallivan | 379/59 |
| 5,062,132 | 10/1991 | Yasuda et al. | 455/418 |
| 5,367,563 | 11/1994 | Sainton | 379/98 |
| 5,469,496 | 11/1995 | Emery et al. | 379/58 |
| 5,568,536 | 10/1996 | Tiller et al. | 455/557 |
| 5,640,444 | 6/1997 | O'Sullivan | 455/557 |
| 5,657,371 | 8/1997 | Sumoni et al. | 455/418 |

*Primary Examiner*—Reinhard J. Eisenzopf
*Assistant Examiner*—Duc Nguyen
*Attorney, Agent, or Firm*—Robert E. Bushnell, Esq.

[57]          ABSTRACT

A wireless data communication system using a microphone/headphone jack of a portable phone. The system may be constructed with a computer modem; a microphone jack and a headphone jack of a portable computer; a portable phone having said microphone/headphone jack; and an interface module which transmits signals by electrically connecting said computer modem and said microphone/headphone jack of said portable phone. A dedicated cable for interfacing the modem and the portable phone is unnecessary, a private protocol for wireless communication is unnecessary, and the private protocol does not need to be previously written into a random access memory when the data of the portable computer is transmitted/received by wireless using the portable phone. The interface module circuit between the computer modem and the portable phone is simplified, by using less cables, and an existing jack may be used for coupling the modem and the portable telephone.

24 Claims, 3 Drawing Sheets

WIRELESS DATA COMMUNICATION SYSTEM USING A MICROPHONE/ HEADPHONE JACK OF A PORTABLE PHONE

CLAIM FOR PRIORITY

This application makes reference to, incorporates the same herein, and claims all benefits acruing under 35 U.S.C. §119 from my earlier filing of an application entitled A Wireless Data Communication System Using A Microphone/Headphone Jack Of A Portable Phone in the Korean Industrial Property Office on the 7$^{th}$ day of May 1997, and was there duly assigned Serial No. 1996/14823, a certified copy of which application is annexed hereto and filed simultaneously herewith.

BACKGROUND OF THE INVENTION

1. Field of the Invention

The present invention relates to wireless data communication systems using a portable telephone, and, more particularly, to wireless data communication systems enabling communication of computer data by connecting the modem of the computer with a portable telephone via a microphone and headphone jack through an interface unit.

2. Description of Related Art

Typically, conventional wireless data communication systems are configured to use a portable phone with a private connector for wireless data communication from a modem mounted in a portable computer. A cable electrically connects the portable telephone and the modem. In conventional wireless data communication systems, specially made connectors are mounted in the modem and the portable phone in order to transmit and receive data via the portable telephone.

Examplars of wireless data communication systems endeavoring to connect a microprocessor to obtain data communication via a wireless handset are found in those circuit configurations for the Multi Frequency Eddy Current Test Apparatus With Intermediate Frequency Processing of T. J. Davis, et alii, U.S. Pat. No. 4,467,281; and in the Microprocessor Controller Interface For Cellular System of A. L. Serrano, et alii, U.S. Pat. No. 4,718,080, as well as the Cordless Phone Data Logger of Wm. G. Haggar, III, et alii, U.S. Pat. No. 4,914,686; the Portable Hybrid Communication System And Method of H. M. O'Sullivan, U.S. Pat. No. 4,972,457; and the Personal Communications Service Using Wireline/Wireless Integration of Mark J. Emery, et alii.

I have found that designs such as these provided by contemporary art tend to rely upon dedicated electrical connectors mounted in the portable phone and the modem that require an excessive number of cables to electrically couple the portable phone and the modem. In addition, a private protocol for wireless communication is needed, and the private protocol needs to be either previously installed or stored in a random access memory prior to use.

SUMMARY OF THE INVENTION

It is therefore an object of the present invention to provide an improved process and apparatus enabling reliable wireless data communication between a microprocessor based appliance and a wireless telephone.

It is another object to provide a process and apparatus enabling wireless data communication by using a microprocessor based appliance and a wireless telephone by using a microphone/headphone jack of a portable telephone.

It is still another object to provide a process and apparatus able to use a conventional data cable coupled to the microphone/headphone jack of a portable wireless telephone in order to enable wireless data communication by using a microprocessor based appliance and the wireless telephone.

It is yet another object to provide a simplified process and apparatus facilitating wireless data communication by using a microprocessor based appliance and a wireless telephone.

It is still yet another object to provide a wireless data communication system using a microphone/headphone jack of a portable phone without a communication private connector for supporting a wireless modem and a private protocol for communication.

To achieve these and other objects, the present invention contemplates data communication between a computer modem of a portable computer using a microphone jack and headphone jack of the portable computer and the microphone and headphone jacks of a portable phone. An interface module having a tranmitter stage and a receiver stage transmits signals via the electrical coupling between the computer modem and the microphone and headphone jack of the portable phone. The transmitter interface module has a differential amplifier for amplifying the differential of the output signals from the transmission terminals of the modem, a transmission gain regulator for regulating the gain of the signal generated by the differential amplifier, and a transmission matching stage for transmitting the signal from the transmission gain regulator to the microphone jack of the portable phone after matching the impedance of the transmitting interface module with the impedance of the microphone jack of the portable phone.

The receiving interface module includes a reception matching stage that outputs signals from the headphone jack of the portable phone after matching the impedance of the portable phone with the impedance of the receiving interface module, and a reception gain regulator that regulates the gain of the signal from the reception matching means and outputs the signal to a receiving terminal of the modem.

Therefore, an amplified differential of the signals from transmitting terminals of the modem is transmitted to the microphone/headphone jack of the portable phone through the microphone jack of the portable computer after passing the transmitting interface module. Accordingly, the signal from the microphone/headphone jack of the portable phone is transmitted to the receiving terminal of the modem through the receiving interface module after passing the headphone jack of the portable computer.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
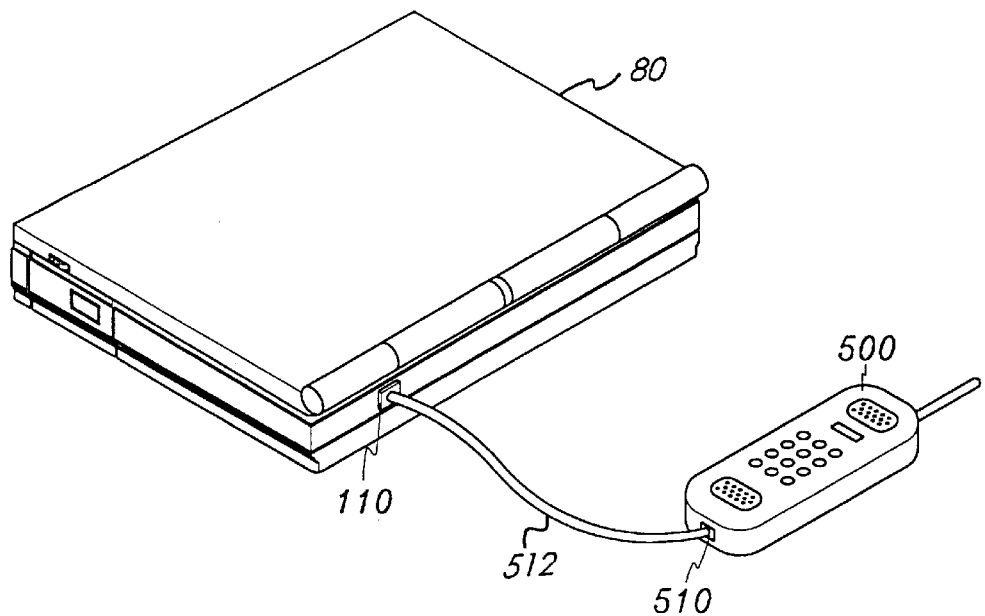
FIG. 1 is a perspective view of a hypothetical representation of one configuration for a conventional wireless data communication system between a portable telephone and a modem having a special dedicated connector for supporting a wireless modem.
Figure 2:
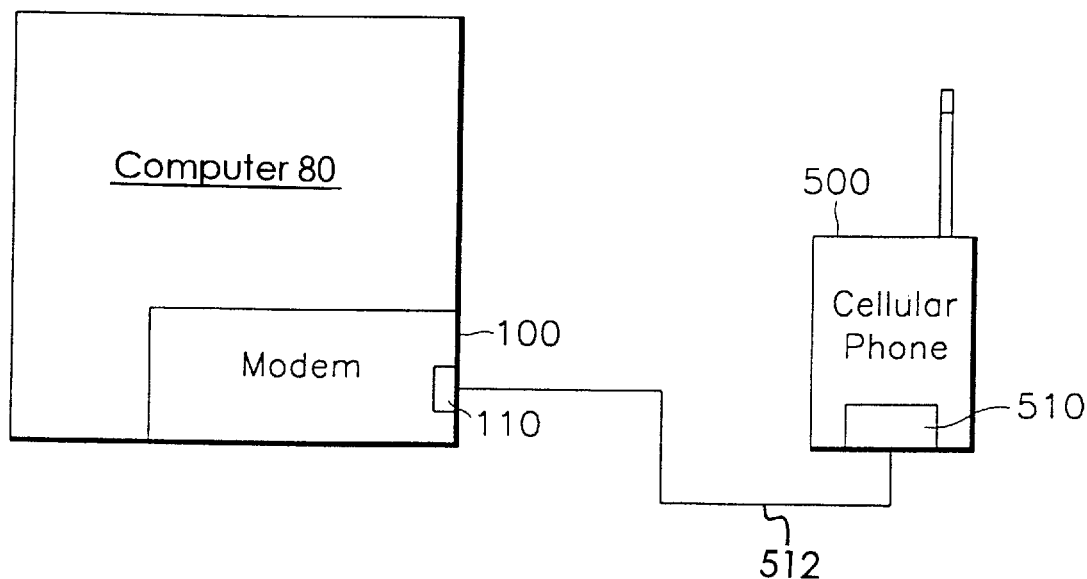
FIG. 2 is a simplified block diagram for a conventional wireless data communication system between a portable telephone and a modem using a dedicated connector coupled to a wireless modem.

Turning now to the drawings, a conventional wireless data communication system using a portable phone will be described. As is shown in FIGS. 1 and 2, a conventional wireless data communication system may be arranged with a portable computer 80 by using a portable telephone 500. A dedicated connector port 110 is formed in the housing of portable computer 80 to provide a port for tranmission of wireless data communication via modem 100 mounted within portable computer 80. A dedicated connector port 510 for wireless data communication is formed in the housing of portable phone 500, and cable 512 fitted with plugs at both ends tailored to dedicated ports 110, 510 electrically connects private connectors 110, 510 between portable phone 500 and modem 100, thereby enabling computer 80 to transmit and receive data via portable telephone 500.

Figure 3:
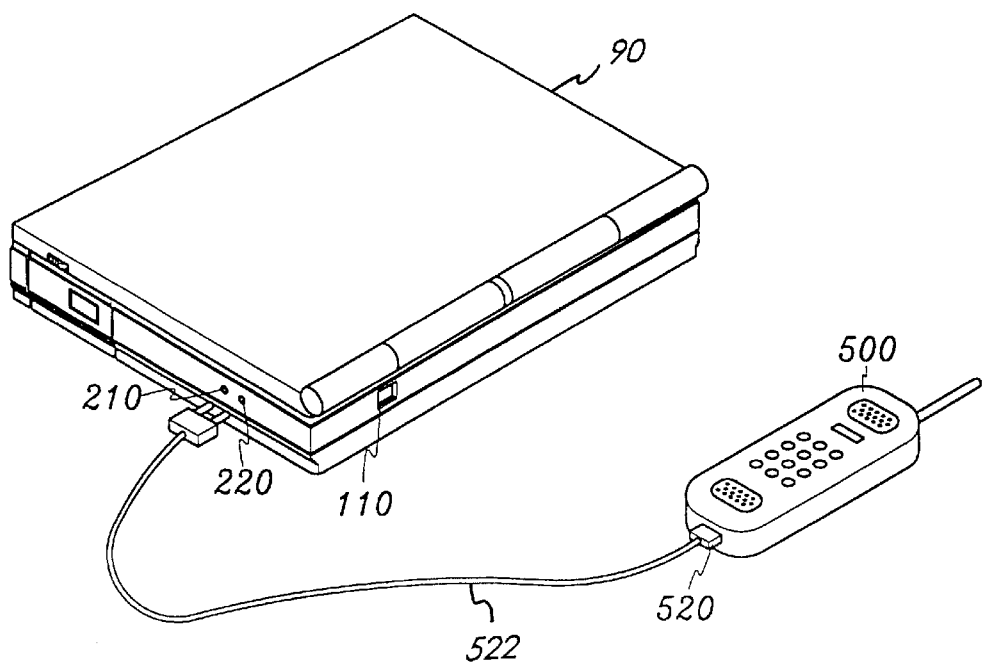
FIG. 3 is a perspective view of a configuration for a wireless data communication system between a portable telephone and a modem using the microphone/headphone jack of the portable telephone in accordance with the practice of a preferred embodiment of the present invention.
Figure 4:
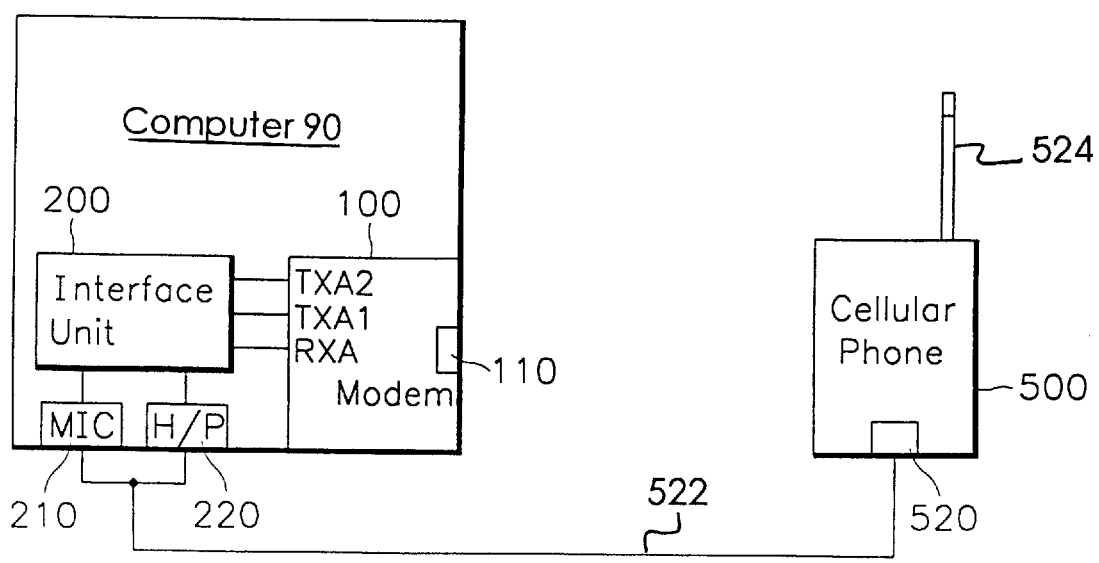
FIG. 4 is a schematic diagram of a wireless data communication system between a portable telephone and a modem using a microphone/headphone jack of the portable telephone in accordance with the practice of a preferred embodiment of the present invention.
Figure 5:
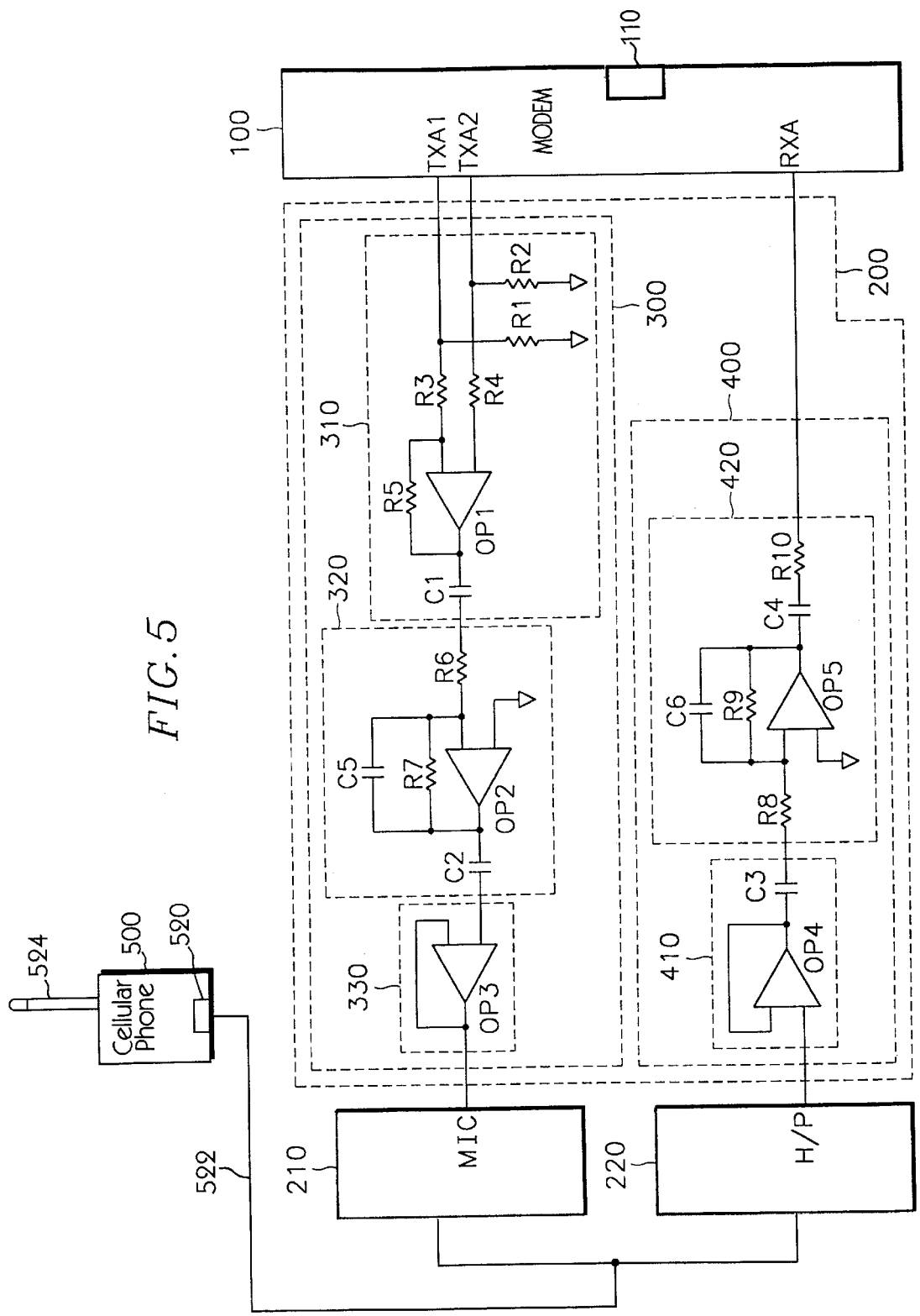
FIG. 5 is a circuit diagram of an interface unit providing communication between a portable telephone and a modem using the microphone/headphone jack of the portable telephone in accordance with the principles of the present invention.

Referring collectively now to FIGS. 3, 4 and 5, a preferred embodiment of the present invention will become apparent from a study of the following detailed description with reference to the accompanying drawings. A portable laptop or notebook computer 90 is internally operationally coupled via microphone port 210 and headphone ports 220 formed in the side of the housing of computer 90, to a port 520 of cellular telephone 500 via a multiconductor electrical cable 522 having one end of one conductor within cable 522 being plug coupleable to an external side of microphone port 210 and the same end of a second conductor within cable 522 being plug coupleable to an external side of headphone port 220, while the opposite ends of the first and second conductors within cable 522 are plug coupleable to the external side of microphone/headphone jack 520 of wireless portable telephone 500. An interface unit 200 includes data transmitter 300 and data receiver 400, and may use either an internal or an external modem 100 coupled to the bus of portable computer 90. Transmitter 300 of interface unit 200 may be constructed with differential amplifier 310, transmission gain regulator, or first filter, 320, and transmission matching means, or first amplifier, 330. Receiver 400 of interface unit 200 may be constructed with reception matching stage, second amplifier, 410, and reception gain regulator, second filter, 420.

In differential amplifier 310, operational amplifier OP1 receives data signals from transmitting terminals TXA1 and TXA2 of modem 100 through resistors R3 and R4 respectively, and resistors R1 and R2 respectively establish pull-down voltages in order to stabilize their respective input signal lines. The input data signal generated by operational amplifier OP1 is amplified in a feedback loop that may be formed by resistor R5 coupled across the one input port and the output port of operational amplifier OP1. Capacitor C1 transmits the output data signal generated at the output port of operational amplifier OP1, to transmission gain regulator 320.

An operational amplifier OP2 has one input terminal connected to a local reference potential such as a circuit ground, and the other input terminal connected via resistor R6 to capacitor C1. The input data signal received across capacitor C1 is amplified by a feedback loop that may be formed with capacitor C5 and resistor R7 connected in parallel across the junction between one input port of operational amplifier OP2 and resistor R6, and the output port of operational amplifier OP2. Capacitor C2 couples the output port of operational amplifier OP2 with one input port of operational amplifier OP3 in transmission gain regulator 320. The other input port of operational amplifier OP3 is connected in a feedback loop to the output port of operational amplifier OP3. Operational amplifier OP3 serves as a buffer, and transmits the output data signal to microphone jack 210 of a portable computer after isolating variations in the load impedance of preceding stages of transmitter 300.

In receiver 400 of interface unit 200, operational amplifier OP4 of reception matching stage 410 transmits an output data signal received via headphone jack 220 from portable computer 90 after isolating the load impedance variations of subsequent circuits in the portable wireless telephone. The output signal of the reception matching stage 410 is transmitted to the reception gain regulator 420 through capacitor C3.

In reception gain regulator 420, operational amplifier OP5 includes one input port connected to a local reference potential such as a circuit local ground voltage, and the other input port coupled to receive data signals transmitted by reception matching stage 410 through capacitor C3 serially coupled to resistor R8. A feedback signal provided by a feedback loop that may be constructed with capacitor C6 and resistor R9 connected in parallel between resistor R8 and the outport port of operational amplifier OP5. Output data signals occurring at the output port of operational amplifier OP5 is transmitted to receiving terminal RXA of modem 100 through capacitor C4 serially coupled with resistor R10.

The operation in accordance with a preferred embodiment of the present invention is as follows. The two input ports of differential amplifier 310 receive data signals from the corresponding transmitting terminals TXA1 and TXA2 of the modem 100 and amplifies the differential of these two input data signals. Transmission gain regulator 320 receives amplified differential signal derived by differential amplifier 310 and regulates the gain of the amplified data signal. Transmission matching stage 330 serves as a buffer, and receives regulated data signals from transmission gain regulator 320, and transmits the regulated signal to microphone port 210 of portable computer 90 after isolating the load impedance variations of previous stages 310, 320 of the transmitter 300.

Reception matching stage 410, which serves as a buffer, transmits the output signal received from portable telephone 500 at headphone jack 220 of portable computer 90 after isolating load impedance variations of previous circuits within portable phone 500. Reception gain regulator 420 receives the buffered data signal from the reception matching stage 410, regulates the gain of the buffered data signal, and transmits the regulated data signal to receiving port RXA of modem 100.

The data transmission from the portable computer to a portable phone is as follows. In an interface module 200 connected between a microphone/headphone jack 520 of portable phone 500 such as a MOTOROLA TAC Model 1000 and the modem 100 of portable computer 90, differential amplifier 310 amplifies the differential of the signals from the transmitting terminal TXA1 and TXA2 of modem 100, the amplified differential signal is passed by transmission gain regulator 320 regulating the gain of the differential signal, transmission matching stage 330 matches the impedance of the regulated signal with the impedance of microphone jack 210 of portable phone 500, and the regulated signal is applied to microphone jack 210 of portable computer 90. The data signal applied to microphone jack 210 is transmitted to the microphone/headphone jack 520 of portable phone 500 through a cable 522, and the data signal is then transmitted by wireless at radio frequencies through antenna 524 of portable telephone 500.

The data transmitted from portable phone 500 to the portable computer is processed as follows. The data received with radio frequency signals via antenna 524 of the portable phone 500 is passed through microphone/headphone jack 520 of portable phone 500 and is applied to interface circuit 200 via headphone jack 220 of portable computer 90 through cable 522. Reception matching stage 410 matches the impedance of portable telephone 500 transmitting the data signal to headphone jack 220 with the impedance of the reception gain regulator 420. Next, the signal passed by reception matching stage 410 is transmitted to receiving terminal RXA of modem 100 after the gain of the data signal is regulated by reception gain regulator 420.

The data to be either transmitted or received may be bidirectionally transmitted between modem 100 and portable phone 500 through this cooperative operation of interface module 200. In the preferred embodiment of the present invention shown in FIGS. 3, 4 and 5, a user executes the communication software loaded into the operational memory of computer 90 when the receiving tone of the modem or a facsimile of the other party is heard. Next, the user may communicate with the other party if the instruction ATD is inputted. Accordingly, the data transmitted and received by wireless radio frequency with the use of a commercially available general purpose modem. Consequently, a specially constructed, dedicated connector for interfacing the modem and the portable phone is unnecessary, a private protocol for wireless communication is unnecessary, and the private protocol does not need to be previously installed or stored in a RAM (random access memory) when the data for the portable computer is either transmitted or received by wireless through the use of a portable phone.

The foregoing paragraphs describe an embodiment of the present invention with a wireless data communication system using a microphone and headphone jack of a portable phone, to enable computer data communication by connecting a computer modem and the microphone/headphone jack of the portable phone through an interface unit. The interface module circuit between the portable computer modem and the portable phone is simplified by using less cables, and if the modem and the portable phone are fitted with a jack of contemporary design, that jack may continued to be used in the practice of this invention.

What is claimed is:

1. A wireless data communication system, comprising:
   a computer modem;
   a microphone jack and a discrete headphone jack for a portable computer;
   a portable phone having a microphone/headphone jack;
   an interface module transmitting electrical signals by electrically connecting transmission and reception ports of said computer modem to different ones of said microphone jack and said headphone jack; and
   a cable coupling said microphone jack and said headphone jack to said microphone/headphone jack of said portable phone.

2. The wireless system of claim 1, wherein said interface module comprises:
   differential amplifier means for amplifying an output signal from transmitting terminals of said modem;
   transmission gain regulator means for regulating the gain of a signal from said differential amplifier means;
   transmission matching means for transmitting a signal from said transmission gain regulator means to said microphone jack of the portable computer after impedance matching;
   reception matching means for outputting a signal from said headphone jack of the portable computer after impedance matching; and
   reception gain regulator means for regulating gain of a signal from said reception matching means and outputs the signal to a receiving terminal of said modem.

3. The wireless system of claim 2, wherein said differential amplifier means comprises:
   a first operational amplifier receiving and amplifying an output signal from the transmitting terminal of said modem;
   a first resistor connected to one input terminal and an output terminal of said first operational amplifier; and
   a first capacitor transmitting an output signal of said first operational amplifier to said transmission gain regulator means.

4. The wireless system of claim 1, wherein said interface module comprises:
   an operational amplifier receiving an output signal from a differential amplifier;
   a resistor and a first capacitor coupled in parallel across one input terminal and an output terminal of said operational amplifier; and
   a second capacitor transmitting a second signal from said operational amplifier.

5. The wireless system of claim 4, wherein said interface module further comprises a second operational amplifier having one input terminal receiving said signal from said second capacitor, and a second input terminal and an output terminal connected to said microphone jack of the portable computer.

6. The wireless system of claim 1, wherein said interface module further comprises:
   an operational amplifier having one input terminal receiving a signal from said headphone jack of the portable computer and a second input terminal connected to an output terminal of said operational amplifier; and
   an output capacitor coupled to said output terminal.

7. The wireless system of claim 6, wherein said interface module further comprises:
   a second operational amplifier receiving an output signal from said output capacitor;
   a second resistor and a second capacitor coupled in parallel across one input terminal and an output terminal of said second operational amplifier; and
   a third resistor and a third capacitor coupled in series to transmit an output signal from said second operational amplifier to said reception port of said modem.

8. The wireless system of of claim 1, wherein said interface module is comprised of a part of said modem.

9. The wireless system of claim 2, wherein said interface module is comprised of a part of said modem.

10. The wireless system of claim 2, wherein said transmission gain regulator comprises:
- a second operational amplifier receiving an amplified signal from said differential amplifier means;
- a resistor and a first capacitor in parallel across one input terminal and an output terminal of said second operational amplifier; and
- a second capacitor transmitting an output signal to said transmission matching means.

11. The wireless system of claim 2, wherein said transmission matching means comprises:
- an operational amplifier having one input terminal receiving a signal from said transmission gain regulator means,
- a second input terminal connected to an output terminal of said operational amplifier, and
- an output terminal connected to said microphone jack of the portable computer.

12. The wireless system of claim 2, wherein said reception matching means comprises:
- an operational amplifier having one input terminal receiving a signal from said headphone jack of the portable computer and a second input terminal connected to an output terminal of said operational amplifier; and
- a capacitor transmitting the signal to said reception gain regulator means.

13. The wireless system of claim 2, wherein said second reception gain regulator means comprises:
- an operational amplifier receiving an output signal from said reception matching means;
- a first resistor and a first capacitor coupled in parallel across one input terminal and an output terminal of said operational amplifier; and
- a second resistor and a second capacitor coupled in series to transmit an output signal from said operational amplifier to said receiving terminal of said modem.

14. A wireless data communication system, comprising:
- an electrically conducting cable comprised of a first electrical conductor and a second electrical conductor, with a first terminal of said first electrical conductor being plug coupleable to an external side of a microphone port of a microprocessor driven appliance, with a first terminal of said second electrical conductor being plug coupleable to an external side of a headphone port of the appliance, and with second terminals of said first electrical conductor and said second electrical conductor being plug coupleable to an external side of a microphone/headphone port of a wireless telephone;
- a differential amplifier generating a first data signal based upon differentials occurring between input ports of said differential amplifier connectable across two discrete output terminals of a modem providing data communication with the microprocessor driven appliance;
- a regulator connected to said differential amplifier to provide a first regulated signal by modifying gain of said first data signal;
- a transmission buffer connectable to transmit said first regulated signal to an internal side of the microphone port;
- a reception buffer connectable to receive a data signal to an internal side of the headphone port; and
- a gain modulator connected to provide a second regulated signal to a receiver port of the modem by modulating gain of said data signal.

15. The wireless system of claim 14, wherein said differential amplifier comprises:
- an operational amplifier receiving and amplifying an output signal of the transmitting terminal of the modem;
- a resistor connected to one input terminal and an output terminal of said operational amplifier; and
- a capacitor transmitting an output signal of said first operational amplifier to said regulator.

16. The wireless system of claim 14, wherein said regulator comprises:
- an operational amplifier receiving an output signal from said differential amplifier;
- a resistor and a first capacitor in parallel across one input terminal and an output terminal of said operational amplifier; and
- a second capacitor transmitting an output signal to said transmission buffer.

17. The wireless system of claim 14, wherein said transmission buffer comprises:
- an operational amplifier having one input terminal receiving a signal from said regulator,
- a second input terminal connected to an output terminal of said operational amplifier, and
- an output terminal connected to the microphone port of the microprocessor driven appliance.

18. The wireless system of claim 14, wherein said reception buffer comprises:
- an operational amplifier having one input terminal receiving a signal from the headphone port of the microprocessor driven appliance and a second input terminal connected to an output terminal of said operational amplifier; and
- a capacitor transmitting the signal to said gain modulator.

19. The wireless system of claim 14, wherein said gain modulator comprises:
- an operational amplifier receiving an output signal from said reception buffer;
- a first resistor and a first capacitor coupled in parallel across one input terminal and an output terminal of said operational amplifier; and
- a second resistor and a second capacitor coupled in series to transmit an output signal from said operational amplifier to a receiving terminal of the modem.

20. A wireless data communication system, comprising:
- a computer having a microphone jack, a headphone jack, a modem and an interface module, wherein said interface module transmits electrical signals between said microphone jack and said modem, and between said headphone jack and said modem;
- said interface module comprising:
    - a differential amplifier connected to said modem;
    - a transmission gain regulator connected to said differential amplifier;
    - a transmission matching stage connecting said transmission gain regulator to said microphone jack;
    - a reception matching stage attached to said discrete headphone jack; and
    - a reception gain regulator connecting said reception matching means to said modem;

and
- a cable for coupling said microphone jack and headphone jack of said computer to a microphone/headphone jack of a portable telephone.

21. A wireless data communication system, comprising:

a computer modem providing a transmission port, a reception port, and a dedicated modem port;

a microphone jack exposed through a first port of a portable computer;

a headphone jack exposed through a second port of the portable computer;

an interface module transmitting data signals by operationally connecting said transmission port and a reception port of said computer modem to different ones of said microphone jack and said headphone jack, said interface module comprising:

a differential amplifier connected to said transmission port of said computer modem;

a first amplifier connecting said differential amplifier to said microphone jack;

a second amplifier coupling said headphone jack to said reception port of said computer modem; and a cable operationally coupling said microphone jack and said headphone jack to a microphone/headphone jack of a portable telephone.

22. The wireless system of claim 21, wherein said interface module comprises:

said differential amplifier amplifying an output signal from said transmitting port of said modem;

a first gain regulator regulating the gain of a signal from said differential amplifier;

said first amplifier connecting said microphone jack of the portable computer after impedance matching;

said second amplifier outputting a signal from said headphone jack of the portable computer after impedance matching; and a second gain regulator regulating gain of a signal from said second amplifier and outputting the signal to said reception port of said modem.

23. The wireless system of claim 22, wherein said differential amplifier comprises:

a first operational amplifier receiving and amplifying an output signal from the transmitting port of said modem;

a first resistor connected to one input terminal and an output terminal of said first operational amplifier; and a first capacitor transmitting an output signal of said first operational amplifier to said first gain regulator.

24. The wireless data communication system of claim 21, with said cable further comprised said cable operationally coupling said microphone jack and said headphone jack to the microphone/headphone jack of the portable telephone independently of any other jack of the portable telephone.

* * * * *